Patented Jan. 8, 1929.

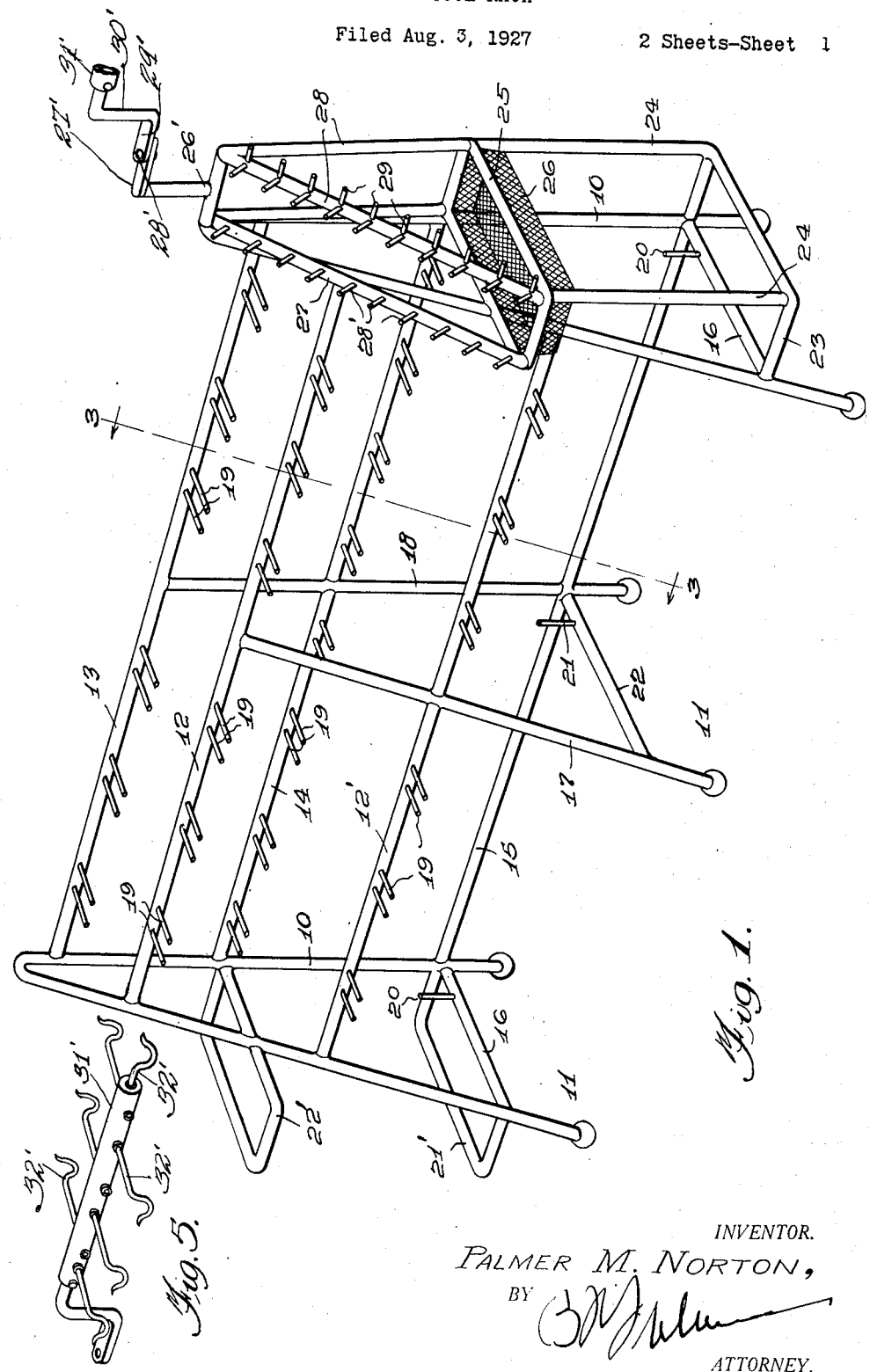

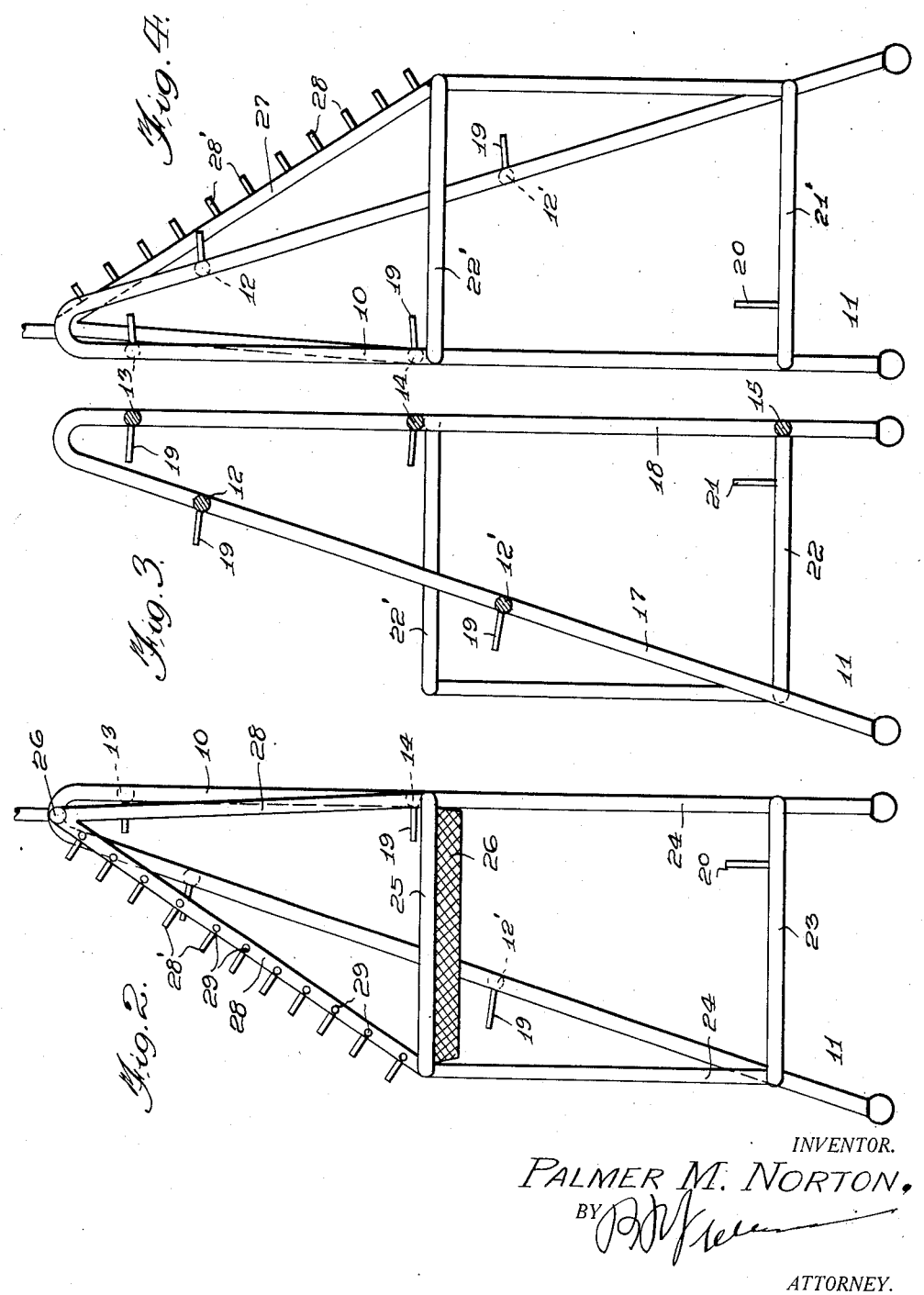

1,698,318

UNITED STATES PATENT OFFICE.

PALMER M. NORTON, OF FLORENCE, SOUTH CAROLINA.

RAILWAY TOOL RACK.

Application filed August 3, 1927. Serial No. 210,356.

My invention relates to racks, and is a rack designed for receiving various tools and implements employed in railway work.

In accordance with my invention, I provide a rack which will detachably hold the various tools or implements used in railway repair work. The rack is of simple construction, compact in the arrangement of its parts, and presents the various tools or implements in a convenient manner for their removal.

In the accompanying drawings, forming a part of this specification, and in which like numerals are employed to designate like parts throughout the same.

Figure 1 is a perspective view of a rack embodying my invention,

Figure 2 is an elevation of one end of the rack,

Figure 3 is a transverse section taken on line 3—3 of Figure 1,

Figure 4 is an elevation of the opposite end of the rack, and,

Figure 5 is a perspective view of a hanger.

In the drawings, wherein for the purpose of illustration, is shown a preferred embodiment of my invention, the rack is shown as embodying a pair of vertical end uprights or standards 10, which are inverted V-shaped in cross section. The standards are preferably formed of tubing and their lower ends may be equipped with feet 11 or the like. The forward arms of the standards 10 are connected by horizontal bars 12 and 12', preferably formed of tubing. The lower bar 12' is arranged near the center of the forward arm of the standard and is hence spaced a considerable distance from the floor, for a purpose to be described. The upper horizontal bar 12 is spaced a considerable distance from the lower bar 12', and is also spaced from the top of the standards, as shown. The rear arms of the standards are connected by three horizontal bars 13, 14 and 15, rigidly secured thereto, and preferably formed of tubing. The bar 13 is positioned above the bar 12 and the bar 14 is arranged in an elevation between the elevations of the forward bars 12 and 12' while the bar 15 is arranged near the lower ends of the standards. The arms of the standards are rigidly connected by horizontal transverse bars 16, arranged adjacent to the bar 15. The bars 13 and 14, with respect to elevation, are staggered, with relation to the bars 12 and 12'.

The numeral 17 designates a front leg or upright, attached to the intermediate portion of the bars 12 and 12', and terminate at the bar 12. The numeral 18 designates a rear leg or bar attached to the rear bars 13, 14 and 15, as shown.

The front bars 12 and 12' are provided with implement holding devices, preferably formed by pairs of pins or fingers 19 rigidly secured thereto. These holding devices are adapted to receive sledge hammers, tongs, shovels, wrenches, or the like. The rear bars 13 and 14 are equipped with similar holding devices, including the pins or fingers 19. The holding devices upon the upper bar 13 are staggered with relation to the holding devices on the arm 12.

The transverse bars 16 are provided near their rear ends and adjacent to the bar 15 with vertical pins or fingers 20, arranged in alinement with vertical pins or fingers 21, rigidly attached to a horizontal transverse bar 22, connecting the legs 17 and 18. These pins co-act with the rear arms of the standards and the rear leg 18, for providing holding spaces or means for long implements, such as saws, levels, or the like, retaining them at the rear portion of the rack. It might be mentioned at this point that track jacks are adapted to be stored upon the floor, within the forward portion of the rack, and for this reason, the horizontal bar 12, is arranged at a substantial elevation from the floor and the vertical pins 20 forming the long implement holding means, are disposed adjacent to the rear side of the rack. This will permit of the track jacks being moved horizontally upon the floor, within the rack.

Arranged at the left end of the rack and adjacent to the standard 10 is a horizontal rectangular frame having its ends attached to the arms of the standards 10, the transverse bar 16 constituting the inner side of the frame. Arranged above the frame 21 is a horizontal rectangular frame 22, having its inner side rigidly attached to the standard 10. These rectangular frames are adapted to receive long implements such as claw bars, pinch bars, track gages, et cetera.

Disposed upon the right end of the rack and adjacent to the standard 10 is a horizontal rectangular frome 23, rigidly attached to the standard. This frame is connected at its outer side with vertical bars 24, extending upwardly for connection with a horizontal transverse rectangular frame 25, the inner side of which is attached to the arms of the standard 10. The frame 25 carries a tray 26 for holding torpedoes, while the lower frame 23 may be employed for holding handles of implements.

Attached to the top of the standard 10, to the right, is a horizontal arm or bar 26, to which are attached inner and outer inverted V-shaped auxiliary standards 27 and 28, the lower ends of which are attached to the horizontal frame 25. The forward arms of the auxiliary standards 27 have horizontal pairs of inclined pins or fingers 28, upon which may be placed short tools, such as small wrenches. The outer auxiliary standard is provided upon its forward arm with fingers 29, extending longitudinally of the rack, upon which may be suspended small tools, such as hand saws, planes, et cetera.

I provide a hanger, including a riser 26', carrying a horizontal arm 27', pivoted at 28' to a horizontal arm 29', which carries a riser 30'. This riser is attached to a horizontal tube 31', carrying hooks 32', upon which buckets or the like may be suspended. It is thus seen that the hanger may be swung in a horizontal plane to various angular positions.

In view of the foregoing description, it will be seen that I have provided a rack which is designed to accommodate all of the various implements necessary in railroad work and these implements are arranged in a very convenient manner for their handling.

It is to be understood that the form of my invention, herewith shown and described, is to be taken as a preferred example of the same, and that various changes in the shape, size and arrangement of parts may be resorted to without departing from the spirit of my invention or the scope of the subjoined claims.

Having thus described my invention, I claim:—

1. A rack of the character described, comprising inverted approximately V-shaped standards, forward and rear sets of horizontal bars connecting the forward and rear arms of the standards and having implement holding devices, front and rear legs arranged between the standards and connected with the front and rear bars, transverse bars connecting the front and rear arms of the standards, a transverse bar connecting the front and rear legs, and vertical pins carried by the transverse bars and arranged adjacent to the rear of the rack, the forward set of horizontal bars being staggered with relation to the rear set of horizontal bars, the lowermost forward horizontal bar being spaced a greater distance from the bottom of the rack within the lowermost rear horizontal bar, the arrangement being such that the lower portion of the front of the rack is open so that jacks or the like may be stored upon the floor within the rack, the vertical pins being adapted to hold horizontally arranged tools upon the transverse bar adjacent to the rear of the rack out of the way of said jacks.

2. A rack of the character described, comprising inverted approximately V-shaped standards, horizontal bars connecting the front and rear of the standards and having implement holding devices, horizontal frames attached to one standard and arranged in superposed relation for holding large tools, horizontal frames connected with the other standard and arranged in superposed relation, a tray carried by the upper of the second named frames for receiving torpedoes while the lower of the second named frame is adapted for supporting handles or the like.

3. In a rack of the character described, inverted approximately V-shaped standards, horizontal bars connecting the forward and rear arms of the standards and having implement holding devices, upper and lower frames carried by one standard and arranged in superposed relation, vertical bars connecting said frames, a horizontal bar carried by the top of the standard carrying said frames, inverted approximately V-shaped auxiliary standards having their tops secured to the last named horizontal bar and their lower ends attached to the upper frame, forwardly and laterally extending holding elements secured to the forward sides of the auxiliary standards, and longitudinally extending holding elements attached to the outer auxiliary standard.

In testimony whereof I affix my signature.

PALMER M. NORTON.